(12) United States Patent
Avery

(10) Patent No.: X4065
(45) Date of Patent: Mar. 25, 1825

(54) PLOUGH

(76) Inventor: George D. Avery

George D. Avery
Letters Patent

The Schedule referred to in these Letters Patent and making part of the same containing a description in the words of the said George D. Avery himself of his improvement in the Plough.

---

In my patent dated Dec. 28th 1818 for an improvement in the Plough I specifi
ed the main and brace bolts in the following words and figures viz," The main
and brace bolts are wrought iron.— the main bolt is 7/8 of an inch diameter, its lower
end is bent in the form of a hook to fit the brace bar on which it is hooked the
hook standing forward from the brace bar; the bolt extends up perpendicularly
through the hole left for that purpose in the top and through the beam. The brace
bolt is 5/8 of an inch diameter and goes slanting up through the handle, through
the hole made for it in the top and through the beam; both bolts have strong screws on their
upper ends by which they secure the beam to the body of the plough." The brace
bolt through the handle and beam as specified in my said patent, may be left out, be
cause the plough is sufficiently strong without it. The upper hind part of the land
side specified in my said patent, should be left out, so as to leave the upper fore part
of it for a part of the upright, which should extend up about 15½ inches above the
lower edge, to the beam which should be straight on its under and land sides, the
upright should be about 2¾ inches thick at its upper end. The top plate spe
cified in my said patent, should also be left out, except the fore end of the top
plate, which is left to extend back from the upper end of the upright about 1½
inch, and should be about one inch thick, and have a hole up through it for
the brace bolt, which is put up close to the hind side of the upright, which
should be fluted to admit the bolt to stand at or near the centre of the upper
end of the upright. The upper hind part of the land side and the top plate were
cast entire with the plough at first to strengthen it, and they did strengthen it great
ly but as the plough is sufficiently strong without them, they are therefore left out.
The brace bolt should be 5/8 of an inch diameter, and long enough to go up through
the beam and nut; the lower end of it is bent to fit the casting to hinder the bolt from
drawing through; or there may be a head on the lower end of the bolt to fit the cast-
ing ings or the lower end may be larger and tapered upwards; that part of the lower end which is in the hole may be square or round; and the hole must be made accordingly, so that the bolt will fit it. In my said patent I specified the brace-bar to brace between the land side and mould board in the following words and figures viz, "The brace bar is of iron, about one inch square; it goes through the land side and mould board 2½ inches above their lower edges and in the proper place to receive the hook on the lower end of the main bolt. The use of the brace bar is to brace between the mould board and land side, and to secure the body of the plough to the beam by its connection with the main bolt." In the castings of my ploughs which were made in the year 1818, I had holes cast for the brace bars and rivetted them in; after considerable experience in rivetting them in, I found that they might be cast in, either of wrought or cast iron. In December 1818 I wrote the specification of my patent, which was dated as aforesaid, 28th December, 1818, in which I described the brace bar, the situation where it should be placed, and its use; but being then unacquainted with specifications, and with the patent law and never having written a specification before, I omitted to describe the manner of fastening the brace bar in, therefore believing myself justly entitled to the benefit of the brace bar, to brace between the land side and mould board and in that manner to strengthen and improve the plough, I specify an improvement on my said patented improvement of the plough as follows, viz. The brace bar to brace between the land side and mould board of the plough, to be of cast or wrought iron and cast in the land side and mould board at its ends, at about 2½ inches above their lower edges, and about 8½ inches from the heel of the plough; or the brace bar, if of wrought iron, may be rivetted in. When a wrought brace bar is to be cast in, it should be cut to the proper length, and the ends made rough to hold it fast in the casting. The manner of casting in, and rivetting in, the brace bar to brace between the land side and mould board to strengthen and improve the plough, as lastly herein before specified, I claim as my invention and improvement George D. Avery Witnesses.
Eld. Wm Elliot
Wm. P. Elliot

94

DRAFTSMAN'S DIVISION.

*All communications should be addressed to*
"The Commissioner of Patents.
Washington, D. C."

2—328 c.

*DEPARTMENT OF THE INTERIOR,*

United States Patent Office,

*Washington, D. C.,* ..............................., *189*...

*SIR:*

*The printed* copies *of Patent No.* G D Avery
are *exhausted.* Mar 24 1825

*As soon as printed a copy will be mailed you to complete your order.*

*By direction of the Commissioner:*

*Very respectfully,*

*Chief Clerk.*

3143b6-97-5m